United States Patent [19]

Smith

[11] Patent Number: 5,450,123

[45] Date of Patent: Sep. 12, 1995

[54] METHOD TO ENHANCE VOICE COMMUNICATIONS USING ENCODED ONE-WAY VIDEO SIGNALS UNDER BI-DIRECTIONAL USER OR NETWORK CONTROL FOR TRANSMITTING STORED OR REAL-TIME VIDEO OR IMAGE INFORMATION

[75] Inventor: David B. Smith, Hinsdale, Ill.

[73] Assignee: AT&T Corp., Murray Hill, N.J.

[21] Appl. No.: 293,254

[22] Filed: Aug. 19, 1994

Related U.S. Application Data

[63] Continuation of Ser. No. 10,202, Jan. 28, 1993, abandoned.

[51] Int. Cl.[6] .................. H04N 7/14; H04M 11/00
[52] U.S. Cl. .................................. 348/17; 379/96; 379/201
[58] Field of Search ............. 348/14, 16, 17; 379/93, 379/96–98, 90, 201

[56] References Cited

U.S. PATENT DOCUMENTS

| | | | |
|---|---|---|---|
| 4,656,623 | 4/1987 | Dalby, Jr. et al. | 370/60 |
| 5,046,079 | 9/1991 | Hashimoto | 348/14 |
| 5,164,982 | 11/1992 | Davis | 379/96 |
| 5,184,345 | 2/1993 | Sahni | 379/53 |
| 5,204,893 | 4/1993 | Choi et al. | 348/17 |

FOREIGN PATENT DOCUMENTS

| | | | |
|---|---|---|---|
| 0380315 | 8/1990 | European Pat. Off. | 379/53 |
| 0524623 | 1/1993 | European Pat. Off. | H04N 7/14 |

OTHER PUBLICATIONS

M. Tasto, "Terminals For Broad-band Office Communications", *IEEE Journal On Selected Areas In Communications*, vol. SAC-4, No. 4, Jul. 1986, pp. 625–632.

Feature Description: Part of a Planning Guide for the 5ESS[(R)] Switch manufactured by AT&T, released in Mar. 1993, but describes a feature generally available in Sep. 1991.

*Primary Examiner*—Wing F. Chan
*Attorney, Agent, or Firm*—Werner Ulrich

[57] ABSTRACT

This invention relates to an arrangement for supplying audio and video signals from separate sources to a video telecommunication station. In one embodiment, the audio is supplied, for example, by a stock broker or agent, while the video is supplied by a separate source controlled by the agent. Advantageously, pre-planned video from a common source, or video from a separate camera, can be supplied to a caller along with the audio message from the agent.

13 Claims, 7 Drawing Sheets

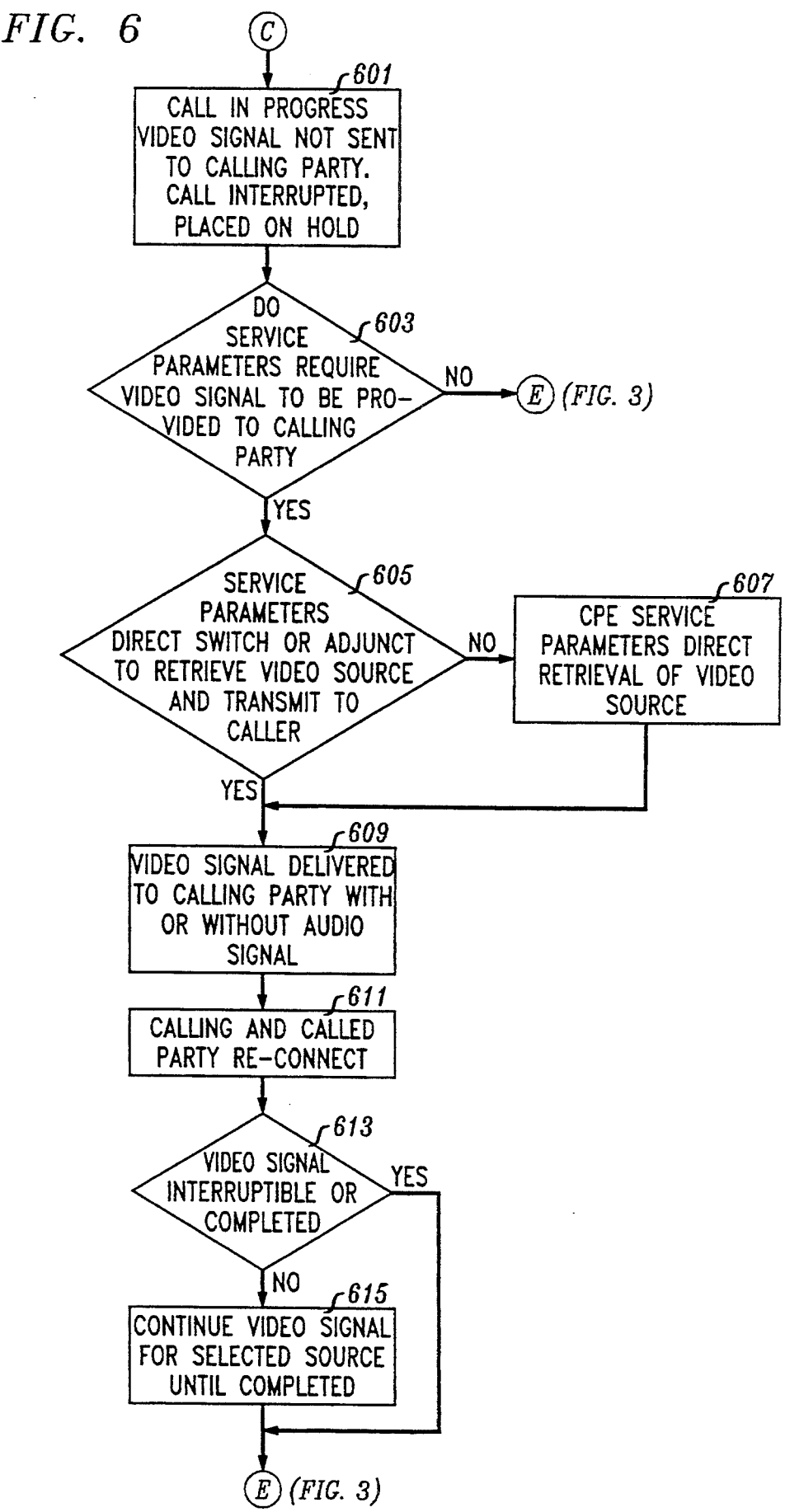

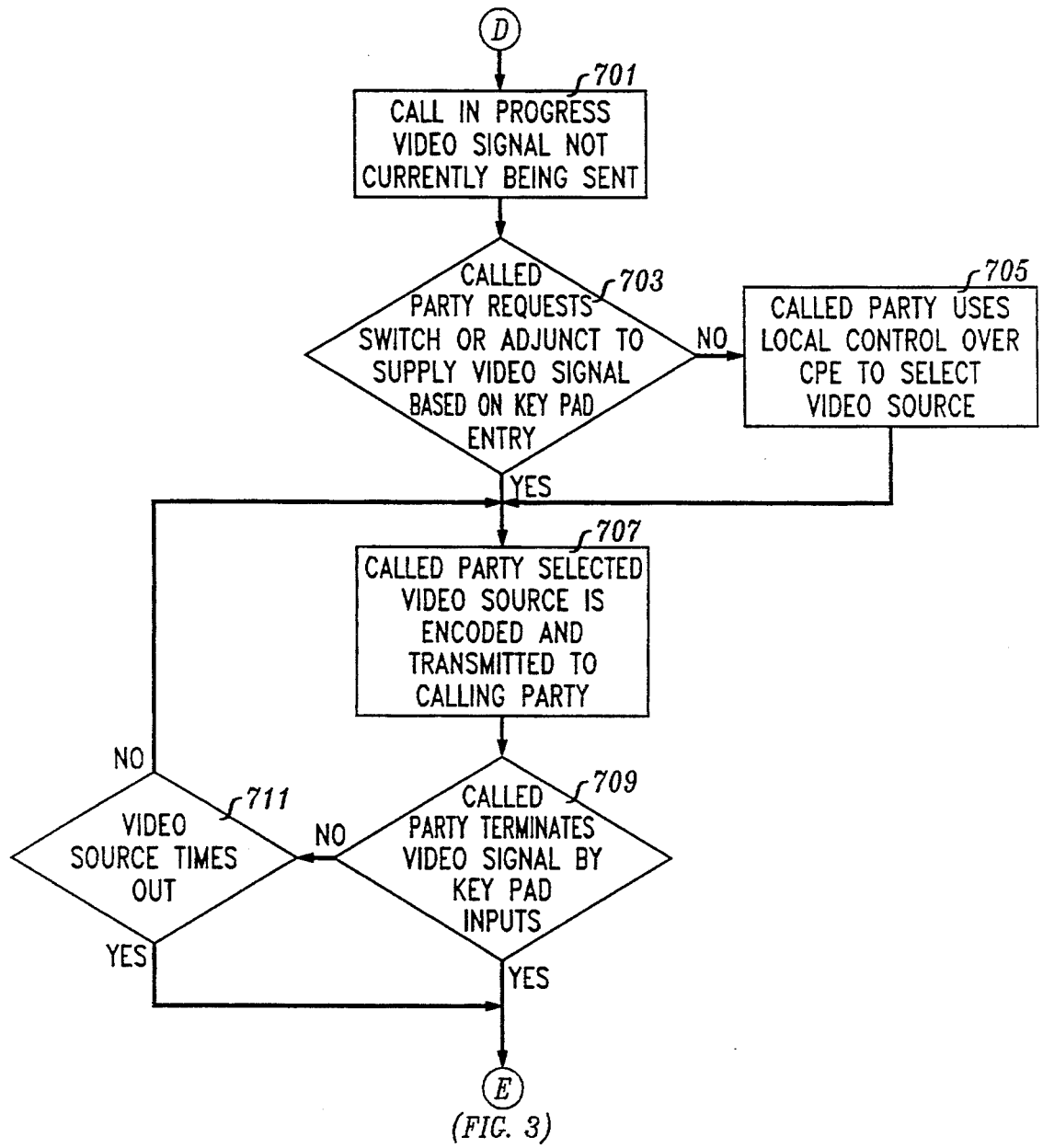

METHOD TO ENHANCE VOICE COMMUNICATIONS USING ENCODED ONE-WAY VIDEO SIGNALS UNDER BI-DIRECTIONAL USER OR NETWORK CONTROL FOR TRANSMITTING STORED OR REAL-TIME VIDEO OR IMAGE INFORMATION

This application is a continuation of application Ser. No. 08/010,202, filed on Jan. 28, 1993, now abandoned.

TECHNICAL FIELD

This invention relates to enhanced utilization of audio and video communications in a telecommunications network.

PROBLEM

It has long been recognized that pure audio communications such as those offered with a simple telephone instrument are inadequate in many ways. For example, when a client is talking to a stockbroker, the stockbroker may be able to rattle off a series of numbers, but the client is deprived of the opportunity of observing the kinds of trends that are most easily portrayed through graphic means. In addition, pure audio telecommunications are not an effective means for communicating with the heating impaired. Video capabilities are now being made available as a result of the recent introduction of AT&T's 2500 (and other) video telephone sets. However, (in this application), the video available on such a video connection is simply a picture of one of the parties, or an object or paper held within range of the camera by one of the parties and this is inadequate for many business or other transactions. The video image is limited to the input source at the origin of the audio, e.g., within camera range, and does not allow for a video source from another origin.

The problem of the prior art, therefore, is that the current video telephone arrangement of a connection between calling and calling party is inadequate to meet the needs of modem communications.

SOLUTION

The above problem is greatly alleviated and an advance is made over the prior art in accordance with my invention wherein a video station is connected to a station of a subscriber, and an audio signal is encoded, or multiplexed in the case of a digital signal from the subscriber station, with a video signal from a video source other than the subscriber station and controllable by the subscriber. Advantageously, such an arrangement allows the subscriber to call up a video signal from a data bank or real time source (e.g., observation cameras):, the video signal for displaying graphical information or other information better depicted pictorially rather than in audio form. In accordance with one specific embodiment of the invention, a subscriber has a video and/or audio station and a terminal connected to a video source and database. The terminal is used to call for a video signal which is then encoded or multiplexed with the audio signal from the subscriber station and transmitted to the video station at the other end of the connection.

In one specific embodiment of the invention, the signals are encoded or multiplexed under the control of signals (e.g., control messages) from the subscriber station in a PBX or Centrex for serving a plurality of such subscriber stations, the video source and database or other video source being equipment controllable from subscriber terminals. A subscriber has both a telephone station (which may be audio or video, but is not required to be video) and a terminal or keypad entry from the audio terminal for calling up information for the subscriber's use or for the use of the connected customer.

In accordance with another embodiment of the invention, the video source is supplied by a common carrier and is part of a service circuit node controlled in a service creation environment system. The subscriber station, which is usually video in order to allow the subscriber to see the same displays seen by the customer, is used to control the requests for video signals from the video source. However, even if the subscriber's station is not video, the subscriber can use the non-subscriber's video station to display video information from a database. The station performs such control by sending dialing signals to a receiver in a central office, the central office for encoding or multiplexing video signals from the video source with audio signals from the subscriber station. Advantageously, the subscriber station can control the display of stored data from the video source and can switch between looking at the video signal supplied by the customer and looking at the video signal from the video source.

DRAWING DESCRIPTION

FIGS. 1 and 2 are block diagrams illustrating the operation of applicant's invention; and FIGS. 3-7 are flow diagrams of programs that are executed to implement the invention.

DETAILED DESCRIPTION

Figure 1:
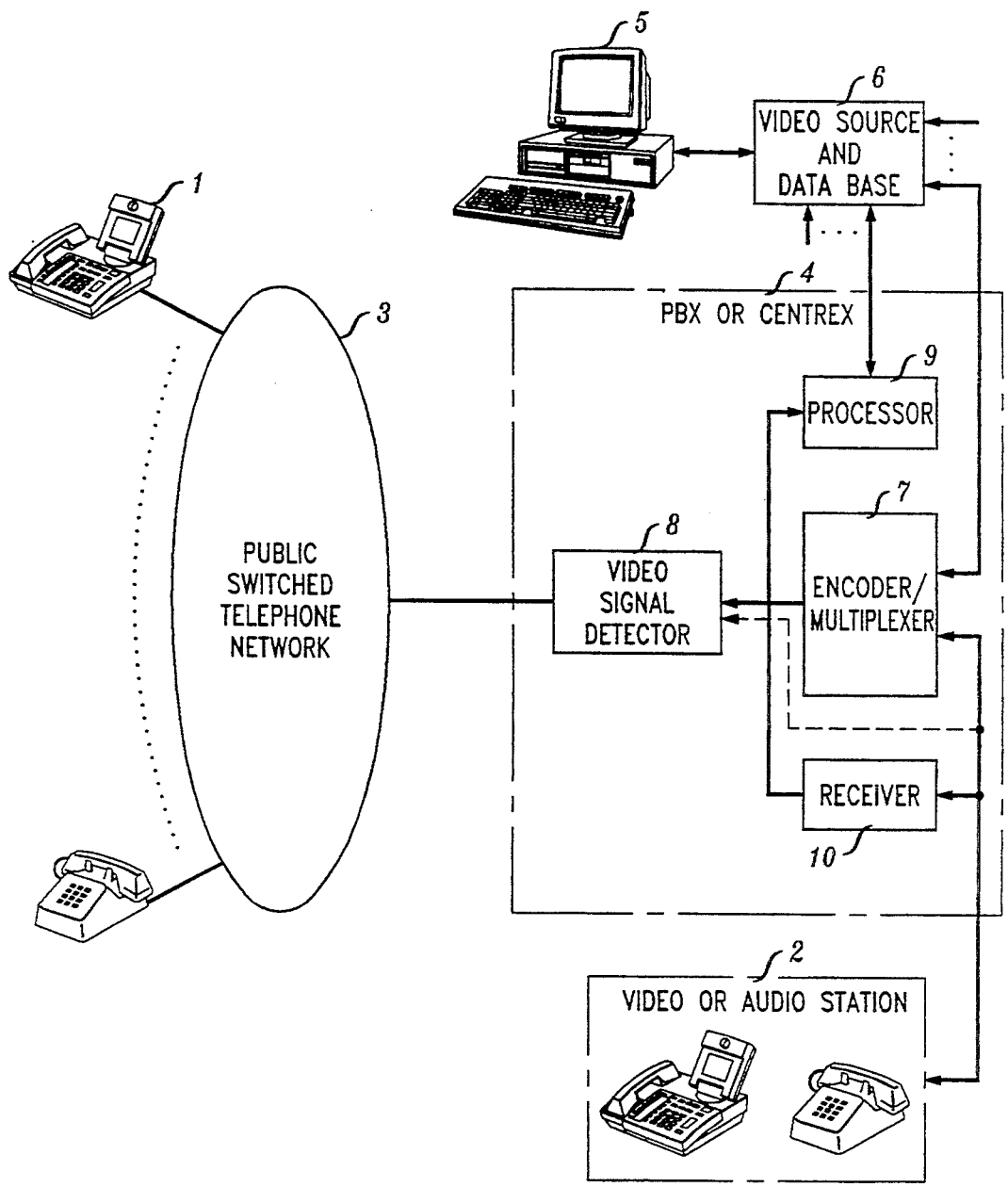

FIG. 1 is a block diagram illustrating the operation of applicant's invention. A video station 1 communicates with a video and/or audio station 2. For the purposes of this description, video station 1, the non-subscribing station, is usually referred to as the calling station and station 2, the subscribing station, the called station. However, the calling and called roles may be reversed between the subscribing and non-subscribing stations. For the service to be enabled, the non-subscriber (i.e., the party not having primary control of the video source) must have a video terminal. The user of station 2 has access from its video or audio station 2 or via terminal 5 for controlling one or more sources of video signals which video signals are returned to station 1 and possibly also to station 2 so that the controlling station sees the display being shown to video station 1. This station may be used in a windowing environment to preview multiple video sources before selecting a specific video to be transmitted to station 1. Additionally, the non-subscribing station may be prompted using audio and/or visual messages to enter selections via a keypad to control video selection. For example, this prompting might best be applied via the non-audio portion of the connection. Station 2 (the subscribing station) may, for example, be the telephone station of a stock broker, and video station 1 (the non-subscribing station), may be the telephone station of a customer of the stock broker.

Station 2 or a special terminal 5 is used by the stock broker to request video signals from the video source and database 6. These video signals may, for example, represent graphical information concerning the profit history of a corporation or a picture of one of the newer products of that corporation. Video stations 1 and 2 are connected via public switched telephone network 3 and a PBX or Centrex 4. In PBX or Centrex 4 is an encoder or multiplexer which takes video signals from video station 2 or video source 6 and combines these with audio signals from station 2 to send to video station 1. If station 2 is a video station (and it need not be in order to get many of the benefits of applicant's invention), video station 2 receives either the video and audio signal generated by video station 1, or the audio signal generated by video station 1, and a video signal from video source 6. PBX or Centrex 4 also contains a video signal detector 8 in order to allow the service implemented by applicant's invention to be invoked if the caller is calling from a video station. This video signal detector may be associated with encoder 7, may be a separate circuit to detect the special characteristics of an audio/video signal, or may be responsive to a common channel signaling message (not shown) for informing the PBX or Centrex 4 that the call is a video/audio call. PBX or Centrex 4 also includes a receiver 10 for receiving data signals from station 2 and for transmitting such signals to processor 9, which transmits control messages to video source 6. Thus, in the arrangement shown in FIG. 1, the video source 6 can be controlled either by terminal 5 directly or from data signals supplied by station 2 and forwarded by processor 9. Video source 6 can include a remote video camera to pick up real time events.

Figure 2:
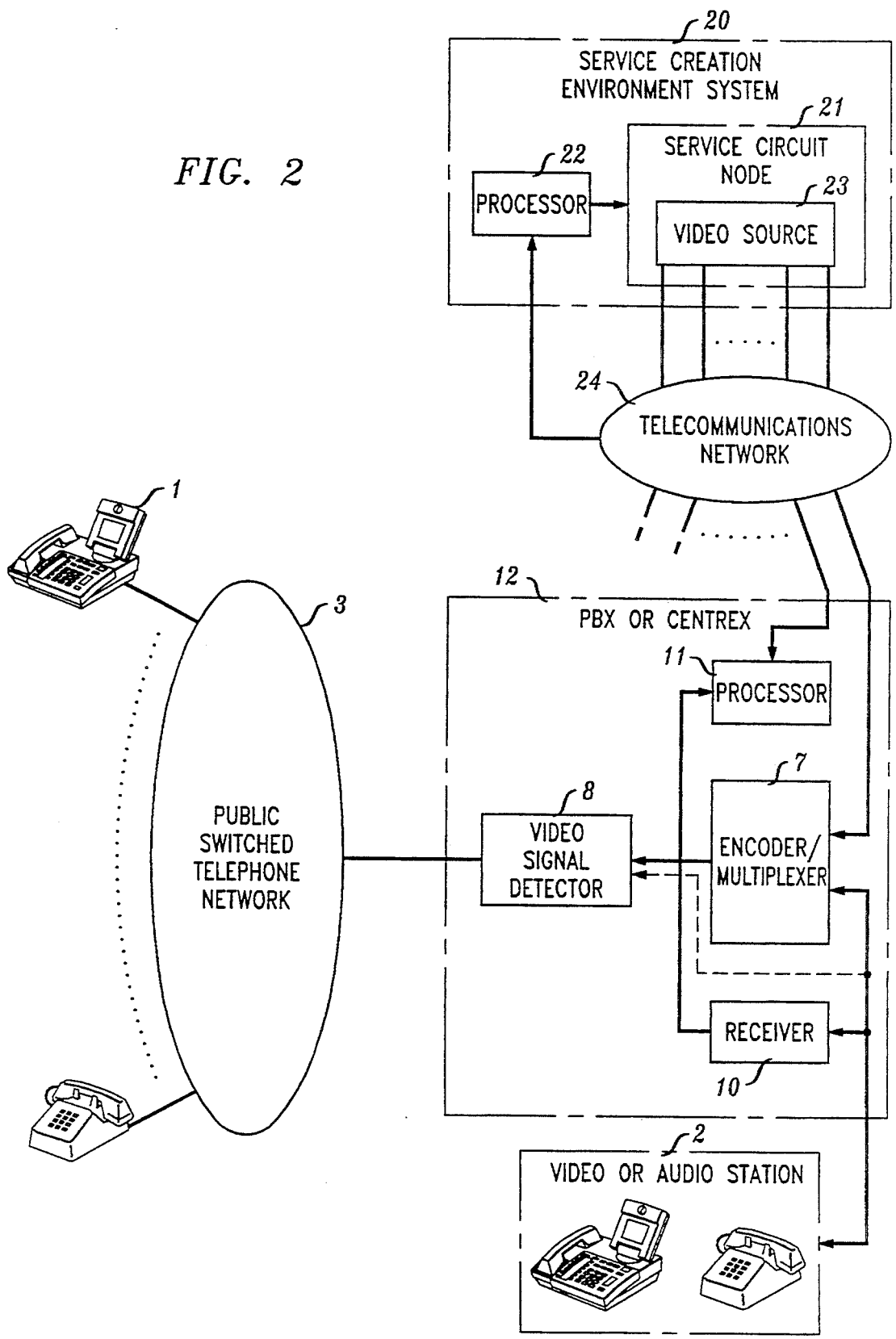

FIG. 2 shows an alternative arrangement for implementing applicant's invention. Common elements are given the same name in FIG. 1 and FIG. 2. In FIG. 2, central office 12 has replaced PBX or Centrex 4 and the processor 11 of that central office has replaced the processor 9 of PBX or Centrex 4. In this configuration, the video source is supplied from a service circuit node 21, housed in a service creation environment system 20. The service creation environment arrangement has been extensively discussed in, for example, in the *AT&T Technical Journal*, volume 70, numbers 3 and 4, 1991, especially pages 72–84. The service creation environment system includes a service circuit node 21, and a control processor 22. Within the service circuit node is a video source 23 which operates under the control of requests from processor 22. Control processor 22 receives control signals generated by processor 11 in response to signals from station 2 to receiver 10. Video source 23 is connected to encoder 7 through a telecommunications network 24 which may be part of the public switched telephone network 3, and which is used for connecting the service creation environment system to a plurality of switching systems such as central office 12.

Figure 3:
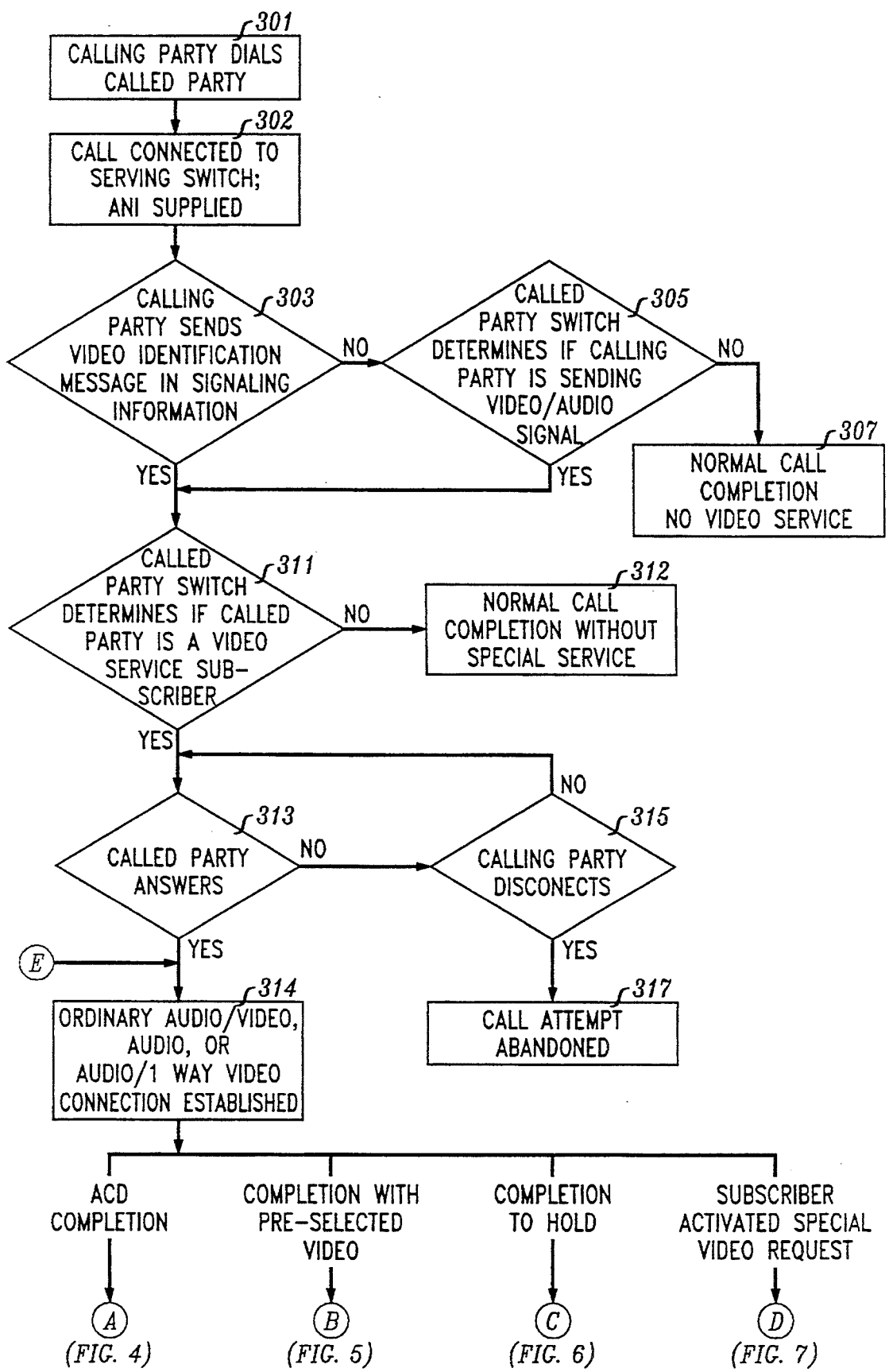

FIGS. 3–7 are flow diagrams illustrating the operation of applicant's invention. FIG. 3 illustrates the processes of call initiation, service verification, and call completion. In FIGS. 3–7, the calling (non-subscribing) party is the party that receives, but does not directly control, the video displays, whereas the called (subscribing) party is the party that has such control. In the case of the example of the stock broker, the calling party is the customer and the called party is the stock broker. Clearly, it is possible for a stock broker to call one of his or her customers, and once the connection has been established, to have this access to the same facilities for controlling video displays that the stock broker can access if the customer has called.

The process is initiated when the calling party dials the called party (action block 301). The call is connected (action block 302) to the serving switch for serving the called party. This is either PBX or Centrex 4 or central office 12. The greatest benefit is available if the caller's automatic number identification (ANI) is supplied with the call, since this number can be used as a key in conjunction with the subscriber's service parameters to help automatically control the video displays to be supplied to that caller.

Test 303 determines whether this is a video call. Examples of ways of making this determination are to look for an indication that this is a video call has been sent in the common channel signaling message accompanying other signal information, or to check whether a predefined detectable tone, designed to alert the network that a video capability is present, has been sent. If not, then the called party serving switch determines if the calling party is sending video/audio signals (test 305). If not, then normal service is provided to that call without providing video service (action block 307). If the result of either of test 303 or 305 is positive, indicating that the calling party is in fact sending a video/audio signal, then test 311 determines whether the called party is a subscriber to the specialized video service described herein. If not, the call is completed normally without providing special service (action block 312). (Of course, if both parties have video stations they may communicate over these video stations using the video service provided by those stations which is a direct, point-to-point video communication).

If it is determined that the called party does subscribe to the specialized video service, then test 313 is used to determine whether the called party answers. If not, test 315 tests whether the calling party disconnects. If the calling party disconnects, then the call attempt is abandoned (action block 317). If the calling party does not disconnect, test 313 is repeated until the called party answers. At that time, an ordinary audio/video, audio, or audio/one-way video connection is established (action block 314). The audio/one-way video connection refers to the use of the service wherein the customer has a video station and so can receive the specialized video displays controlled by the stock broker or other subscriber, but the stock broker may not have the video station, so can neither receive video from the customer nor transmit video directly from his/her own station to the customer. The calling party answer step may be temporarily deferred to allow the caller to access the video source under his own control or to receive a preliminary video or audio/video signal prior to requesting a connection to an agent. In some cases, the connection to an agent may not be necessary.

Figure 4:
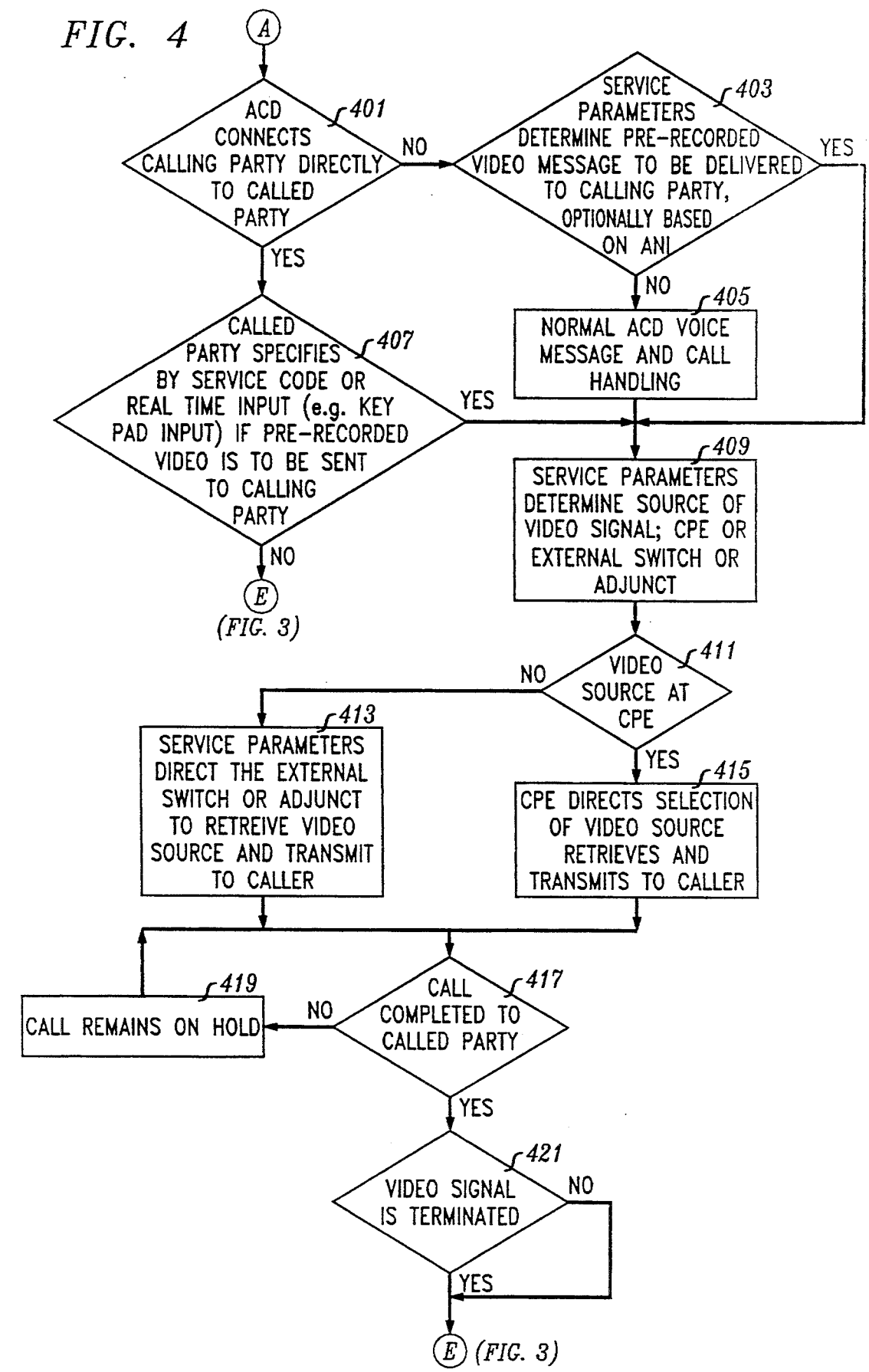

From the establishment of the connection (action block 314), the more specialized actions described in FIGS. 4–7 can be initiated. FIG. 4 relates to some of the specialized actions associated with the service when the subscriber (i.e., the entity controlling the video displays, e.g., the stock broker) is accessed via an automatic call distributor (ACD). These actions include the provision of special video displays in case the caller is forced to wait until the called party, e.g., the stock broker, is able to answer the call. In a system which only provides audio service, the callers are frequently supplied with some combination of music and announcements. In the case of audio/video, a video or video/audio logo or other informational video or video/audio signal can also be supplied under the control of the subscriber facilities using this invention.

Initially, test 401 determines whether the ACD directly connects the calling party to the called party. If not, then service parameters stored in the memory of processor 9 optionally combined with the caller's ANI identification determine whether a prerecorded video or audio/video message is to be delivered to the calling party (test 403). If not, then normal ACD voice and message call handling is performed (action block 405), until the calling and called parties are connected. Once the calling and called parties are connected, the called party determines by service code or real-time input, (for example, using a keypad entry) whether a prerecorded video is to be sent to the calling party (test 407). If not, then normal call handling (action block 314 of FIG. 3) continues. If a prerecorded video message is to be sent to the calling party either because the called party has so specified or because of a positive result of test 403 resulting from a delay in establishing a connection to the called party, then service parameters stored in processor 9 are used to determine the source of the video signal (action block 409). The service parameters, might, for example, refer to the type of the account of the caller, so that an appropriate video announcement can be returned. The source may be customer premises equipment, or an external switch or adjunct, or a video source in a service creation environment system (block 20 of FIG. 2). Test 411 tests whether the video source is at the customer premises equipment; if not, services parameters stored in the processor direct the external switch or adjunct to retrieve the appropriate video source, and transmits this to the caller (action block 413). In case the called party is already on line, the called party's audio will simultaneously be transmitted by using the encoder 7 to combine the audio and video signals. If the video source is at the customer premises equipment (positive result of test 411), then the customer premises equipment directs selection of the video source and retrieves this signal and transmits it to the caller (action block 415).

Test 417 determines whether the call is now completed to the called party; if not, the call remains on hold (action block 419) and test 417 (which also succeeds both action block 413 and 415) is reentered. If the call has been completed, then test 421 checks whether the video signal transmission has been completed. If so, then normal call connection (action block 314, FIG. 3) is entered. Otherwise, the system waits until the video signal has been completed before transferring back to action block 314.

Figure 5:
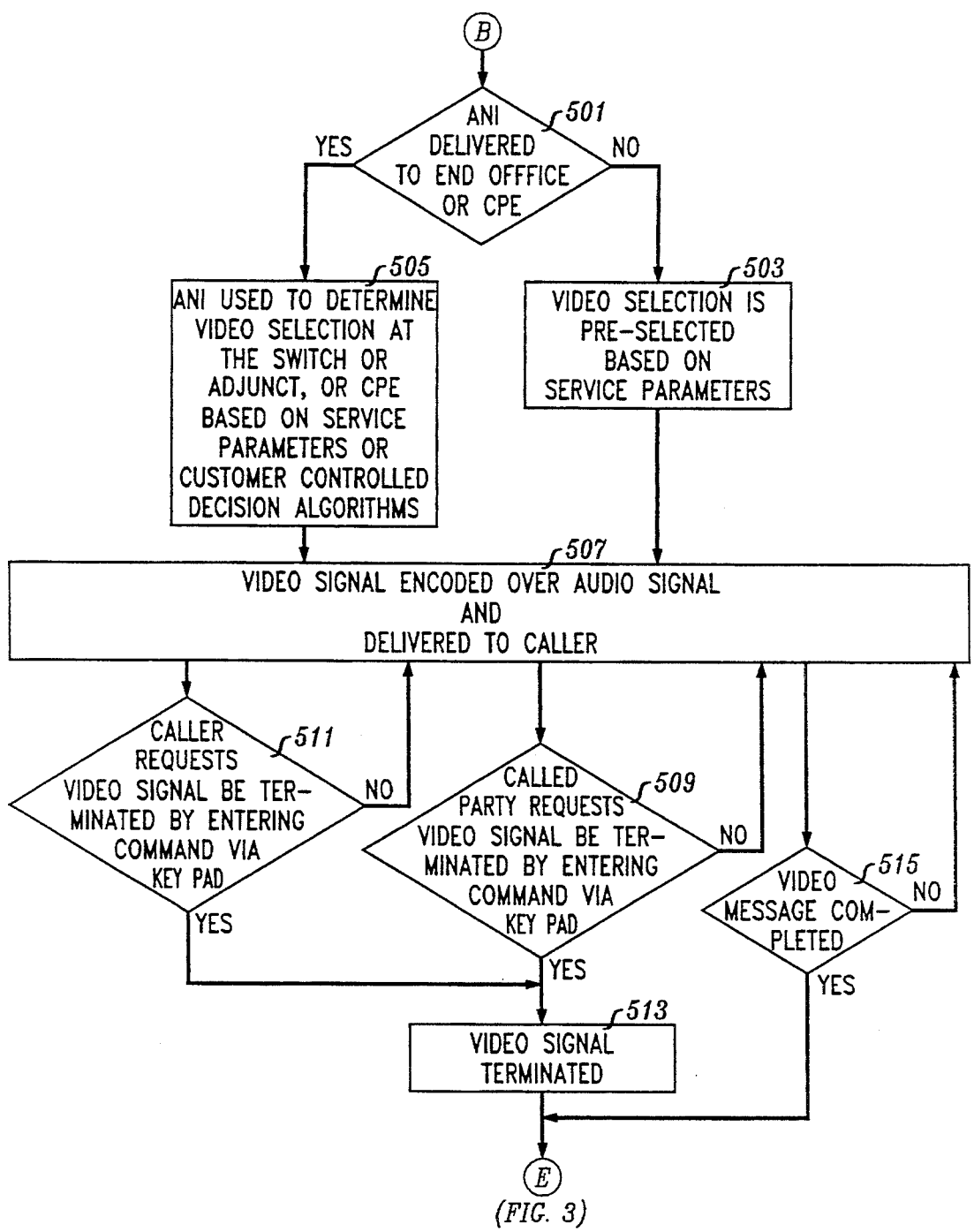

FIG. 5 illustrates the actions performed when a preselected video signal is supplied to a caller upon call connection. Test 501, which is entered from action block 314 (FIG. 2) tests whether automatic number identification (ANI) has been delivered for this call. If not, then the video selection is preselected (action block 503) based on service parameters stored either in one of processors 9 or 11 or 22 or in a processor of video source and database 6. If an ANI has been delivered, then ANI can be used to determine which video selection should be provided to the caller (action block 505). This decision can be based on the service parameters coupled with information related to the caller's ANI coupled with decision algorithms supplied by the customer (i.e., stock broker), which may include client specific, geographic, time of year, or other customized decision criteria. The video signal is encoded over the audio signal (from the audio signal, if any) from the called station and delivered to the caller (action block 507). Test 509 and 511 are used to determine whether either the called party or the caller requests that the video signal be terminated through an indication entered via the keypad of the video station. If not, the signal continues. If so, the video signal is terminated (action block 513) and action block 314 (FIG. 3) is entered. If the caller has not requested the termination of the video signal, test 512 checks whether the caller is requesting a selectable video signal. If not, the video signal is continued (action block 507). If so, then the selected video signal is transmitted to the caller (action block 514) and action block 507 is subsequently reentered. Test 515 checks to see if the video message has been completed. If not, transmission of the message continues (action block 507). When the message is completed, action block 314 is entered.

FIG. 6 illustrates actions performed when the calling party is placed on hold. This may happen, for example, in case the stock broker receives another call and temporarily places the original caller on hold. The situation which follows action block 314 is described in action block 601, which shows that the call is in progress. The video signal is not currently being sent to the calling party, and the call is interrupted and placed on hold. Test 603 determines whether the service parameters require a video signal to be provided to the calling party. If not, then action block 314 is reentered. If so, then test 605 determines whether the service parameters direct the switch or adjunct to retrieve video source and transmit to the caller via an encoder or multiplexer. If not, then the customer premises equipment service parameters direct the retrieval of video from a customer premises equipment source (action block 607). Action block 609 which follows action block 607 or a positive result of test 605, specifies that a video signal is delivered to the calling party with or without an accompanying audio signal (such as music or a message). Subsequently, when the calling and called parties are reconnected (action block 611), a test is made whether the video signal is interruptable or completed. If so, then the signal is interrupted and action block 314 is reentered. If not, then the video signal is continued from the selected source until completed (action block 615) after which action block 314 is entered.

FIG. 7 illustrates a request for a video signal while a call is in progress. For example, the stock broker and customer may have been discussing a particular company and the stock broker wants to display to the caller a dynamic graph illustrating earnings over the last ten years, and growth and shifts in industry outlook. The initial state for FIG. 7 is that the call is in progress and no special video signal from a video data source is currently being sent (action block 701). Test 703 determines whether or not the called party requests a switch or adjunct to supply a video signal based on a keypad entry. If not, the subscriber may use local control over customer premises equipment to select a video source (action block 705). In either case, the selected video source is encoded or multiplexed and transmitted to the calling party (action block 707). Test 709 determines whether the called party wishes to terminate the video signal through an appropriate control signal entered by a keypad input. If so, action block 314 (FIG. 3) is reentered. If not, then test 711 determines whether the video source times out, (i.e., has completed transmission of its message). If a message is still ongoing, action block 707 is reentered. Otherwise, action block 314 is entered when transmission of the selected video source is either completed or interrupted.

This invention can be used to enhance communications with the deaf or hearing impaired, from a service bureau equipped as indicated in FIG. 1. For example, the display generated for an airline reservations clerk can be presented to the hearing impaired caller.

This type of arrangement can also be used whenever a video station user communicates with an audio station of a non-subscriber. The video signal can be generated, for example, by a telecommunications service supplier, to provide advertising or other information, such as weather, supplied by a third party, to the video station at the same time as the audio channel is being used for the telephone conversation. The video source in FIG. 2 can be connected via the encoder/multiplexer 7 at the same time that an audio connection exists between an audio station 2 and video station 1; the encoder/multiplexer 7 can be part of a central office and need not be considered Centrex equipment.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of communicating between a subscriber and a video station, said method comprising:
   establishing a connection for transmitting signals comprising audio signals between said video station and a station of said subscriber; and
   establishing a video connection from a remote source of pre-recorded video signals, said remote source of pre-recorded video signals controlled by said subscriber, to said video station;
   combining said audio signals and said video signals into a combined signal for simultaneously carrying audio signals from said station of said subscriber and video signals from said remote source of pre-recorded video signals together over a single channel through a telecommunications network to said video station.

2. A method of communicating between a subscriber and a video station, said method comprising:
   establishing a connection for transmitting signals comprising audio signals between said video station and a station of said subscriber;
   establishing a video connection from a remote source of pre-recorded video signals, said remote source of pre-recorded video signals controlled by said subscriber, to said video station;
   combining said audio signals and said video signals into a combined signal for simultaneously carrying audio signals from said station of said subscriber and video signals from said remote source of pre-recorded video signals together over a single channel through a telecommunications network to said video station; and
   controlling said remote source of pre-recorded video signals by said subscriber, in response to automatic number identification of said video station, to select one of a plurality of video signals to be retransmitted to said video station.

3. The method of claim 2 wherein said remote source of pre-recorded video signals is controlled by data selected using parameters based on said automatic number identification.

4. The method of claim 1 wherein said source of video signals is in a service creation environment system controllable from said subscriber via a telecommunications network.

5. A method of communicating between a subscriber and a video station, said method comprising:
   establishing a connection for transmitting signals comprising audio signals between said video station and a station of said subscriber;
   establishing a video connection from a remote source of pre-recorded video signals, said remote source of pre-recorded video signals controlled by said subscriber, to said video station;
   combining said audio signals and said video signals into a combined signal for simultaneously carrying audio signals from said station of said subscriber and video signals from said remote source of pre-recorded video signals together over a single channel through a telecommunications network to said video station;
   further controlling said remote source of pre-recorded video signals from said video station;
   whereby a customer at said video station can request video signals from said remote source of pre-recorded video signals.

6. A method of communicating between a subscriber and a video station, said method comprising:
   establishing a connection for transmitting signals comprising audio signals between said video station and a station of said subscriber;
   establishing a separate video connection from a remote source of pre-recorded video signals, said remote source of pre-recorded video signals controlled by said subscriber, to said video station;
   combining said audio signals and said video signals into a combined signal for simultaneously carrying audio signals from said station of said subscriber and video signals from said remote source of pre-recorded video signals together over a single channel through a telecommunications network to said video station;
   wherein said step of establishing a connection for transmitting signals comprising audio signals between said video station and a station of said subscriber comprises the step of detecting that said calling station being connected to said station of said subscriber is a video station transmitting a video signal.

7. The method of claim 6 wherein said step of detecting comprises detecting a predefined detectable tone.

8. The method of claim 6 wherein said step of detecting comprises detecting an indication of a video signal in a message for that call, said message comprising a field for indicating a video signal connection.

9. A method of communicating between a video station and an audio station, said method comprising:
   establishing a single channel connection for transmitting a single channel signal between said video station and said audio station; and
   combining an audio signal from said audio station and a pre-recorded video signal from a remote transmit only video signal source onto the single channel signal being transmitted to said video station
   wherein said video signal is selected based on an automatic number identification of said video station.

10. A method of communicating between a subscriber and a video station, said method comprising:
    establishing a single channel connection between said video station and a station of said subscriber;

responsive to receiving a hold signal from said station of said subscriber, inserting pre-recorded video signals, from a remote source of video signals, onto said single channel connection to said video station; and controlling said remote source of video signals in response to automatic number identification of said video station.

11. A method of communicating between a video station and an audio station, said method comprising:

establishing a single channel connection for transmitting a single channel signal between said video station and said audio station; and combining an audio signal from said audio station and a pre-recorded video signal from a remote transmit only video signal source onto the single channel signal being transmitted to said video station.

12. The method of claim 11 wherein said remote transmit only pre-recorded video signal source is a telecommunications carrier.

13. The method of claim 11 wherein said remote transmit only pre-recorded video signal source is an advertiser.

* * * * *

UNITED STATES PATENT AND TRADEMARK OFFICE
CERTIFICATE OF CORRECTION

PATENT NO. : 5,450,123

DATED : September 12, 1995

INVENTOR(S) : David B. Smith

It is certified that error appears in the above-identified patent and that said Letters Patent is hereby corrected as shown below:

Column 7, claim 4, line 67, after "said" insert —remote—.

Column 7, claim 4, line 68, before "video" insert —prerecorded—.

Signed and Sealed this

Nineteenth Day of March, 1996

Attest:

BRUCE LEHMAN

*Attesting Officer*     *Commissioner of Patents and Trademarks*